US010641620B2

(12) United States Patent
Hall

(10) Patent No.: US 10,641,620 B2
(45) Date of Patent: May 5, 2020

(54) HIGH ACCURACY, LOW POWER SIGNAL CONDITIONER

(71) Applicant: Simmonds Precision Products, Inc., Vergennes, VT (US)

(72) Inventor: Robbie W. Hall, Charlotte, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 428 days.

(21) Appl. No.: 15/600,117

(22) Filed: May 19, 2017

(65) Prior Publication Data

US 2018/0335319 A1 Nov. 22, 2018

(51) Int. Cl.
*G01D 5/24* (2006.01)
*G08C 19/04* (2006.01)
*B64D 47/00* (2006.01)

(52) U.S. Cl.
CPC ............... *G01D 5/24* (2013.01); *B64D 47/00* (2013.01)

(58) Field of Classification Search
CPC ........... G01D 5/24; G08C 19/06; G08C 19/04
See application file for complete search history.

(56) References Cited

U.S. PATENT DOCUMENTS

| 4,206,449 | A | | 6/1980 | Galvin et al. |
| 4,672,331 | A | | 6/1987 | Cushing |
| 5,703,576 | A | * | 12/1997 | Spillman, Jr. ............ G01D 5/48 340/870.16 |
| 6,097,332 | A | | 8/2000 | Crosby, II |

FOREIGN PATENT DOCUMENTS

| DE | 19940422 A1 | 3/2000 |
| DE | 10027507 C1 | 1/2002 |
| DE | 102007038225 A1 | 2/2009 |
| DE | 102013102237 A1 | 9/2014 |
| DE | 102013205207 A1 | 9/2014 |
| EP | 2233890 A2 | 9/2010 |

OTHER PUBLICATIONS

Extended European Search Report for EP Application No. 18171801. 6, dated Nov. 16, 2018, pp. 7.

* cited by examiner

*Primary Examiner* — Toan M Le
(74) *Attorney, Agent, or Firm* — Kinney & Lange, P. A.

(57) ABSTRACT

A system and method of obtaining a high accuracy value from at least one sensor using a conditioning circuit includes providing, by a processor, a first signal to the at least one sensor and obtaining a first sensor response from the at least one sensor; providing, by the processor, the first signal to a reference component and obtaining a first reference response from the reference component; providing, by the processor, a second signal, greater than the first signal, to the at least one sensor and obtaining a second sensor response from the at least one sensor; providing, by the processor, the second signal to the reference component and obtaining a second reference response from the reference component; and calculating, by the processor, the high accuracy value based on the first sensor response, the second sensor response, the first reference response and the second reference response.

20 Claims, 4 Drawing Sheets

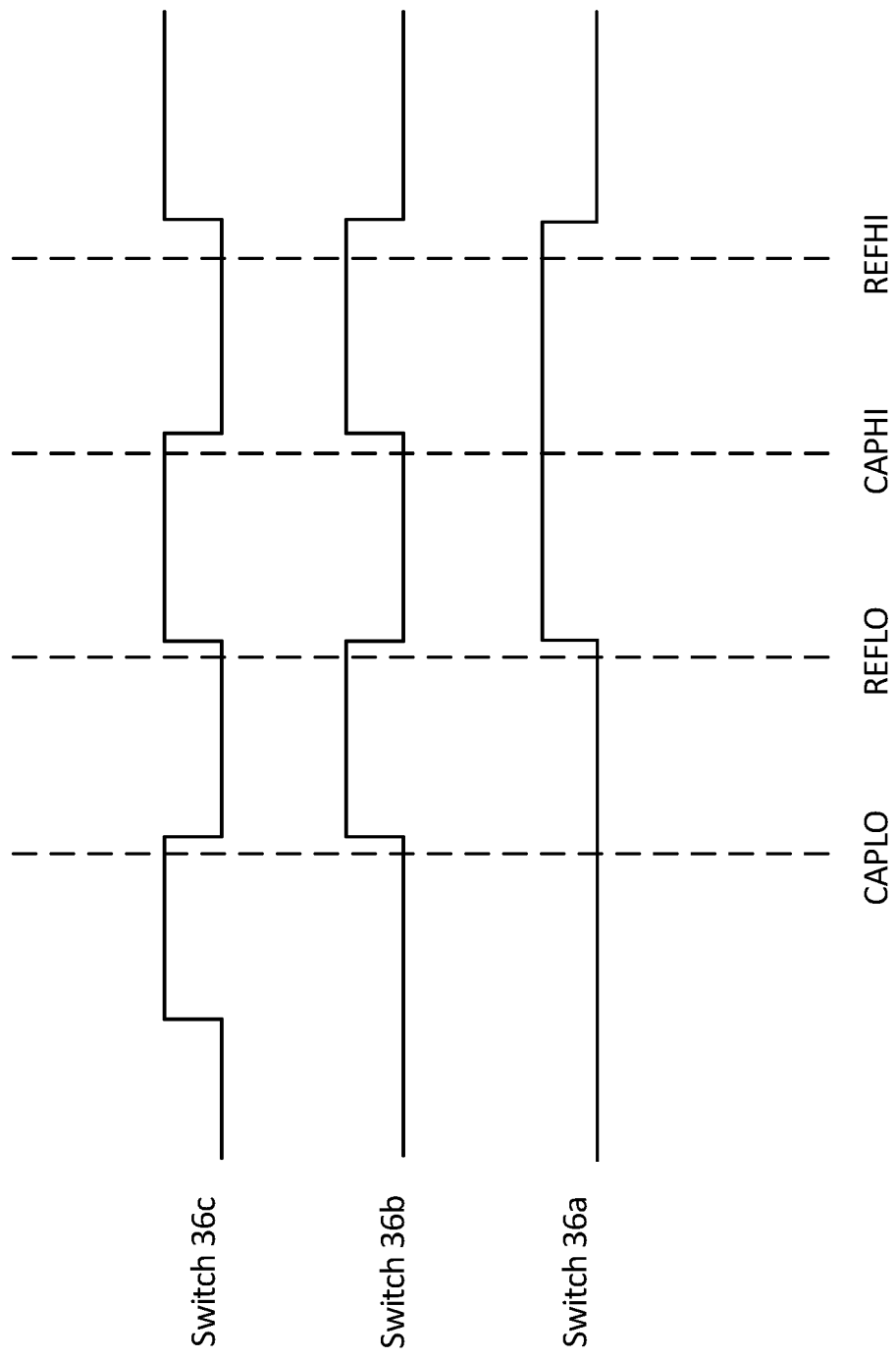

HIGH ACCURACY, LOW POWER SIGNAL CONDITIONER

BACKGROUND

The present disclosure relates generally to signal conditioning, and in particular to a system and method for providing power conditioning for sensors.

Aircraft systems include many sensors to determine characteristics of the environment. These systems often require electronics to measure the characteristics accurately. Power is needed to energize these electronics and may be excessive due to the power demands of high performance devices. This creates a challenge in systems in which only a low power source, such as optical power via fiber or solar cell, or inductive power, is available. It is desirable to improve measurement accuracy in sensor systems in which only a low power source is available.

SUMMARY

A method of obtaining a high accuracy value from at least one sensor using a conditioning circuit includes providing, by a processor, a first signal to the at least one sensor and obtaining a first sensor response from the at least one sensor; providing, by the processor, the first signal to a reference component and obtaining a first reference response from the reference component; providing, by the processor, a second signal, greater than the first signal, to the at least one sensor and obtaining a second sensor response from the at least one sensor; providing, by the processor, the second signal to the reference component and obtaining a second reference response from the reference component; and calculating, by the processor, the high accuracy value based on the first sensor response, the second sensor response, the first reference response and the second reference response.

A method of obtaining a high accuracy value from a sensing element using a conditioning circuit includes providing first and second low impedance signals to the sensing element, wherein the second low impedance signal is greater than the first low impedance signal; obtaining first and second sensing responses from the sensing element based on the respective first and second low impedance signals; providing the first and the second low impedance signals to a reference component; obtaining first and second reference responses from the reference component based on the respective first and second low impedance signals; and determining, by a processor, the high accuracy value based on the first and the second sensing responses and the first and the second reference responses.

A conditioning circuit for a sensor system includes a processor, a dual voltage drive, a switch network, and a current-to-voltage converter. The dual voltage drive is configured to generate first and second low impedance signals, wherein the second low impedance signal is greater than the first low impedance signal. The switch network is configured to select between at least one sensor and a reference component. The current-to-voltage converter configured to convert a current signal from the switch network to a voltage signal. The processor controls the switch network and dual voltage drive to receive a first sensor response from the at least one sensor and a first reference response from the reference component based on the first low impedance signal, and receive a second sensor response from the at least one sensor and a second reference response from the reference component based on the second low impedance signal. The processor is configured to calculate a sensed value for the at least one sensor based upon the first and second sensor responses and the first and second reference responses.

BRIEF DESCRIPTION OF THE DRAWINGS

FIG. 4 is a signal diagram illustrating switch control signals for determination of a high accuracy sensor value using a power conditioning circuit.

DETAILED DESCRIPTION

A power signal conditioning circuit is disclosed herein that provides high accuracy sensing for low power sensor systems. The conditioning circuit includes a low power processor, a dual voltage drive circuit, a switch network and a current-to-voltage conversion circuit. The components of the power signal conditioning circuit may be low power devices that have limited accuracy. To account for the limited accuracy, a dual voltage/ratio-metric approach may be utilized to determine a high accuracy value for the low power sensor system.

The low power processor outputs a square wave, which is converted into a low impedance (Lo-Z) sine wave by the dual voltage drive. The dual voltage drive provides either a high Lo-Z or low Lo-Z signal, based upon control by the processor. The Lo-Z signal is provided to one or more sensors and a reference component. The switching network selects between the outputs of the sensors and reference component. The current-to-voltage conversion circuit converts the value of current from the respective selected sensor or reference component to a voltage that is conditioned and provided to the processor. The processor uses this voltage to determine the sensed value and provides a serial data stream indicative of the sensed value as output.

Figure 1:
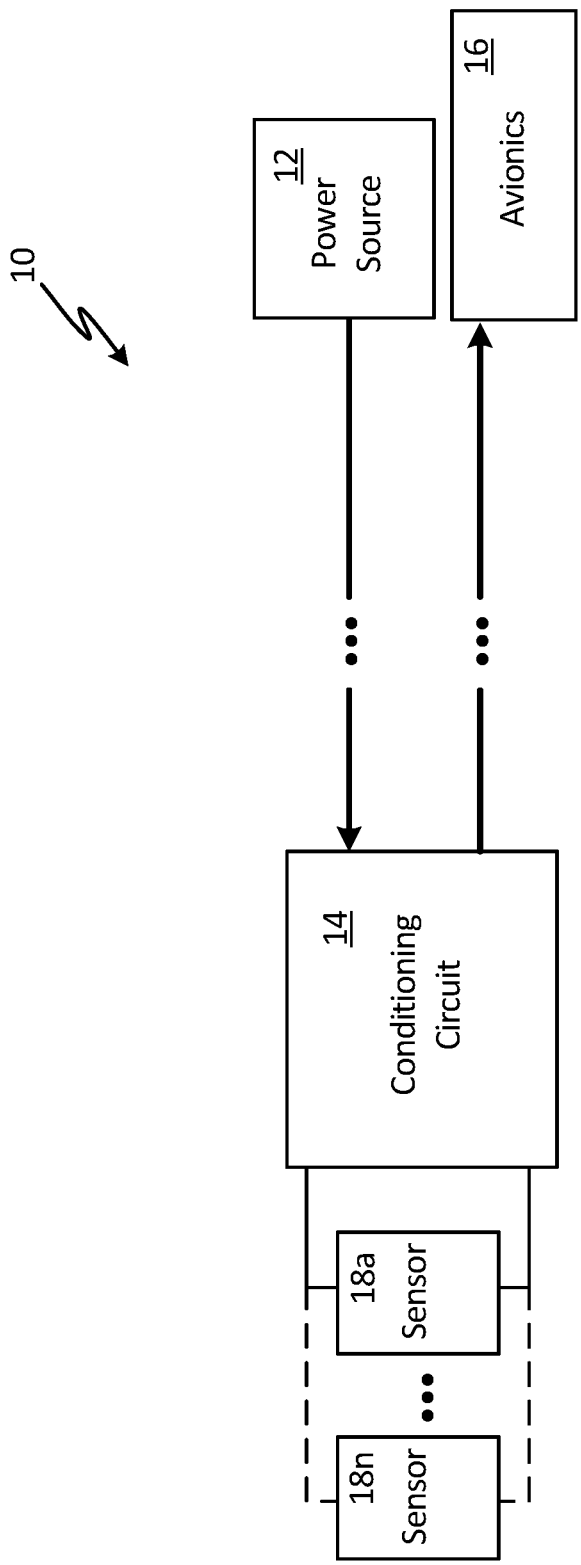
FIG. 1 is a block diagram illustrating a system for conditioning power from a power source using a power conditioning circuit.

FIG. 1 is a block diagram illustrating system 10 for conditioning power from a power source 12 using power conditioning circuit 14. System 10 includes power source 12, power conditioning circuit 14, avionics 16 and sensors 18a-18n. In one example embodiment, power conditioning circuit 14 and sensors 18a-18n may be colocated as part of an active sensor or remote data concentrator, for example. Power source 12 may be integral to avionics 16, or a separate low power source. Avionics 16 or some other computer system may receive power from a main power bus, such as a 28 volt (V) direct current (DC) aircraft power bus and convert it into a low power signal for inductive or optical transmission, for example, to the active sensor or remote data concentrator. In other embodiments, system 10 may be implemented in ground systems, such as fuel farms, or any other systems in which high accuracy, low power sensing is desired.

Figure 2:
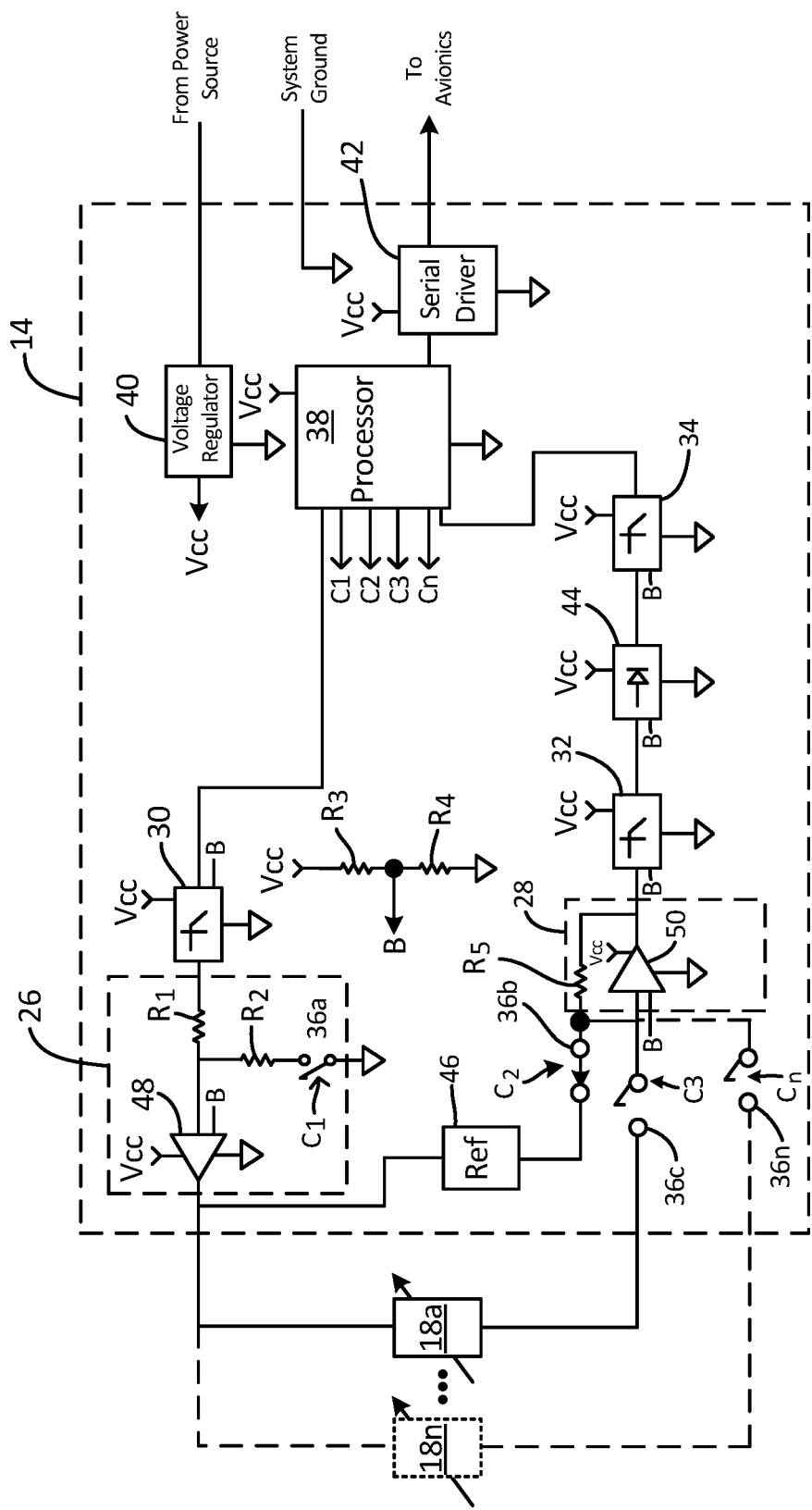
FIG. 2 is a circuit diagram illustrating a power conditioning circuit.

FIG. 2 is a circuit diagram illustrating conditioning circuit 14. Conditioning circuit 14 includes dual-voltage drive circuit 26, current-to-voltage interface circuit 28, low pass filters 30, 32 and 34, switches 36a-36n, processor 38, voltage regulator 40, serial driver 42, rectifier 44, reference component 46 and amplifiers 48 and 50.

Power is received from power source 12 and conditioned by voltage regulator 40. Voltage regulator 40 is any circuit capable of conditioning the received power from power source 12 and outputting a desired conditioned power. The conditioned power, $V_{CC}$, is provided as power for the electronic components of conditioning circuit 14. The power, $V_{CC}$, is provided to processor 38, which may be any microprocessor or other digital logic circuit, for example. Processor 38 may be low power, for example, configured to operate at a low frequency to facilitate low power operation. A voltage divider circuit that includes R3 and R4 is utilized to provide an above ground reference point for the electronics of conditioning circuit 14.

Dual voltage drive circuit 26 is utilized to excite sensors 18a-18n and reference component 46 with a low impedance (Lo-Z) sine wave voltage at a fixed frequency. Processor 38 may be configured to output a square wave signal, for example, which is provided to low pass filter 30. Low pass filter 30 may be any low pass filter circuit and is configured to output a sine wave based on the square wave input. The output of low pass filter 30 is buffered by dual voltage amplifier 48. The gain of amplifier 48 is controlled by switch 36a. Switch 36a receives control via signal C1 from processor 38. Thus, amplifier 48 provides either a high Lo-Z signal or a low Lo-Z signal based upon the state of switch 36a. The output of amplifier 48 is provided to sensors 18a-18n and reference component 46. Reference component 46 may be any high accuracy reference such as a high precision resistor, for example.

A switch network that includes switches 36b-36n is configured to select between the output of sensors 18a-18n and the output of reference component 46. Processor 38 is configured to control the switch network via control signals C2-Cn. Switches 36a-36n are any mechanical or electrical switches controllable by processor 38 to selectively conduct current. The output of the switch network is provided to current-to-voltage interface 28, which includes resistor R5 and amplifier 50. Current-to-voltage interface circuit 28 is configured to convert current from sensors 18a-18n and reference component 46 into an output voltage indicative of the current.

The output of current-to-voltage interface circuit 28 is provided to low-pass filter 32, which may be configured to remove high frequency noise picked up by any of the sensor signal lines and converted to voltage through current-to-voltage interface circuit 28. Low-pass filter 32 may be implemented to eliminate the chance that signal noise is perceived as sensor data by processor 38. Rectifier 44, which may be a full-wave precision rectifier (FWPR), for example, is configured to convert the sine-wave output of low-pass filter 32 to a full wave rectified signal. Low-pass filter 34 may be configured to smooth the rectified signal from rectifier 44 into a high quality direct current (DC) signal for processor 38. Low-pass filter 34 may be configured, for example, such that the degree of ripple on the output of low-pass filter 34 is low enough that the ripple will not cause a change in digital value once the signal is converted from analog to digital. Processor 38 may include analog-to-digital conversion, or conditioning circuit 14 may include a separate analog-to-digital conversion circuit configured to provide a digital signal to processor 38 indicative of the analog output of low-pass filter 34.

Figure 3:
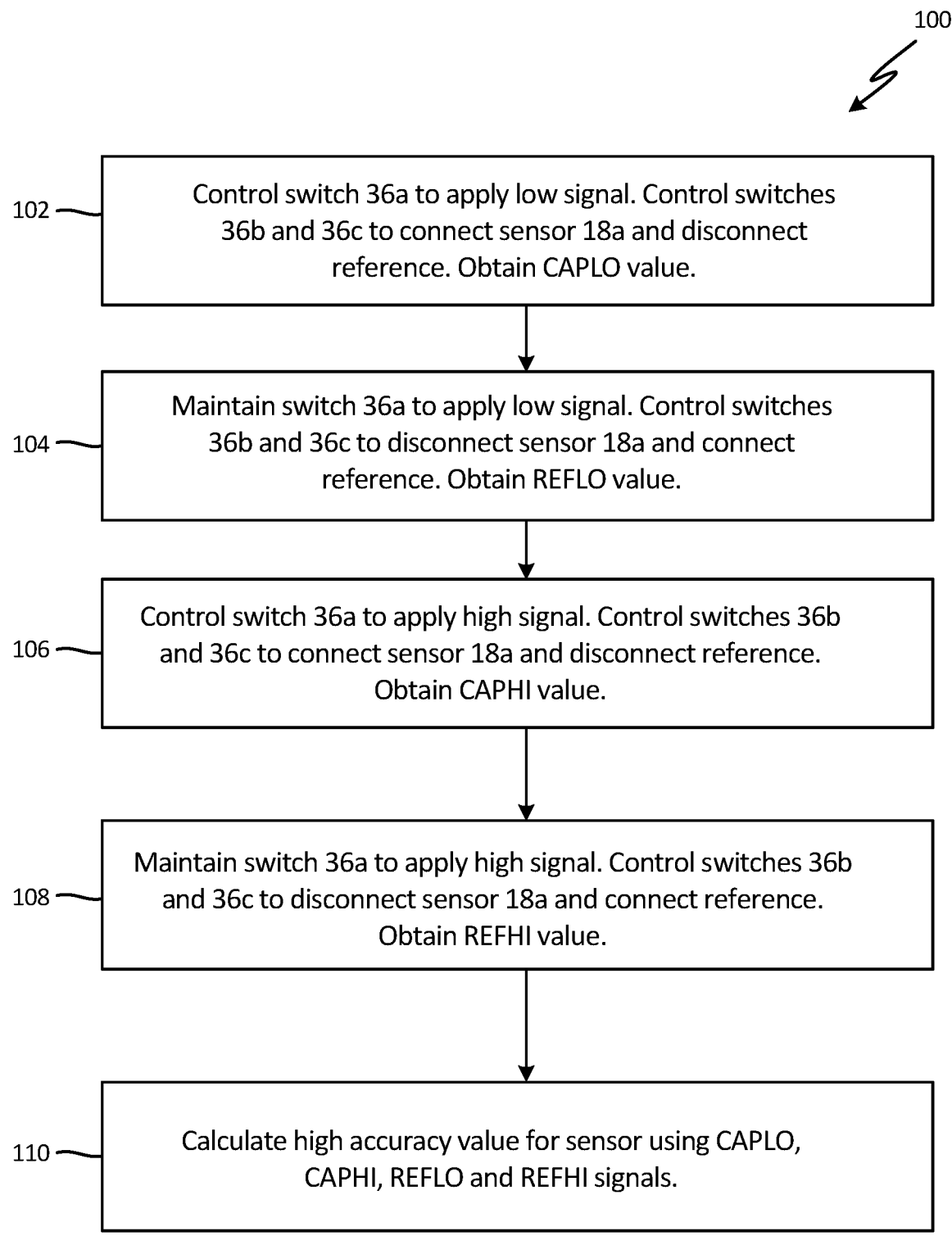
FIG. 3 is a flowchart illustrating a method of determining a high accuracy sensor value using a power conditioning circuit.

Processor 38 utilizes the analog-to-digital conversion to calculate high accuracy sensor values of sensors 18a-18n, for example, using a dual voltage/ratio-metric algorithm (shown in FIGS. 3 and 4). The electronics of conditioning circuit 14 may be low power electronics that may include offset and gain errors, for example. The dual voltage/ratio-metric algorithm may be utilized to account for, and cancel out, the offset and gain errors of the low power electronic components. The calculated sensor values are provided as a serial output to serial driver 42. Serial driver 42 may be configured to transmit the sensor data serially back to avionics 16, for example. This serial communication may be provided electronically over a wired or wireless connection, optically, or using any other communication scheme.

With continued reference to FIG. 2, FIG. 3 is a flow chart illustrating method 100 of a dual voltage/ratio-metric algorithm, and FIG. 4 is a signal diagram illustrating control signals C1-C3 provided to switches 36a-36c. While illustrated for a single sensor 18a, method 100 may be repeated for all sensors 18a-18n. In an example embodiment, sensors 18a-18n are capacitive sensing elements. In other embodiments, sensors 18a-18n may be any type of sensing element including inductive sensing elements, resistive sensing elements, and any other device capable of sensing a characteristic of the environment and providing an electrical response.

At step 102, processor 38 controls switch 36a to apply the low Lo-Z signal and controls switches 36b and 36c to connect sensor 18a to current-to-voltage conversion circuit 28, and disconnect reference component 46 from current-to-voltage conversion circuit 28. Processor 38 may keep these switch states for any desired time, such as 50 milliseconds, for example. During these 50 milliseconds, processor 38 may sample and store the value received from low pass filter 34. This value is indicative of the sensed value from sensor 18a while receiving the low signal (CAPLO).

At step 104, processor 38 maintains the state of switch 36a to continue to apply the low Lo-Z signal. Processor 38 controls the state of switches 36b and 36c to connect reference component 46 and disconnect sensor 18a from current-to-voltage conversion circuit 28. Processor 38 may hold these switch states for the same amount of time as in step 102, for example. Also during step 104, processor 38 may sample and store the value received from low pass filter 34. This value is indicative of the excited reference 46 while receiving the low signal (REFLO).

At step 106, processor 38 controls the state of switch 36a to apply a high Lo-Z signal. Processor 38 controls the state of switches 36b and 36c to connect sensor 18a and disconnect reference component 46 from current-to-voltage conversion circuit 28. Processor 38 may hold these switch states for the same amount of time as in step 102 and/or 104, for example. Also, during step 106, processor 38 may sample and store the value received from low pass filter 34. This value is indicative of the sensed value from sensor 18a while receiving the high signal (CAPHI).

At step 108, processor 38 maintains the state of switch 36a to continue to apply the high Lo-Z signal. Processor 38 controls the state of switches 36b and 36c to connect reference component 46 and disconnect sensor 18a from current-to-voltage conversion circuit 28. Processor 38 may hold these switch states for the same amount of time as in step 102, 104 and/or 106 for example. Also during step 108, processor 38 may sample and store the value received from low pass filter 34. This value is indicative of the excited reference 46 while receiving the high signal (REFHI).

At step 110, processor 38 uses CAPLO, CAPHI, REFLO and REFHI to calculate a high accuracy sensor readout for sensor 18a. In an example embodiment, processor 38 may use the following equation to calculate the high accuracy sensor readout:

$$\text{Capacitance} = C_{REF} * \left( \frac{V_{CAPHI} - V_{CAPLO}}{V_{REFHI} - V_{REFLO}} \right) - C_{STRAY}$$

Where:

Capacitance=the high accuracy value of sensor 18*a*;

$C_{REF}$=a reference capacitance stored in processor 38 for sensor 18*a*;

$V_{CAPHI}$=the voltage value for CAPHI;

$V_{CAPLO}$=the voltage value for CAPLO;

$V_{REFHI}$=the voltage value for REFHI;

$V_{REFLO}$=the voltage value for REFLO; and $C_{STRAY}$=the stray capacitance in conditioning circuit 14.

Once processor 38 has calculated the capacitance value for sensor 38*a*, processor 38 may providing the value to serial driver 42. Serial driver 42 may communicate the capacitance value to avionics 16 or any other system. While described for capacitive sensor, a similar method may be performed for any type of sensing elements. This way, system 10 is able to obtain high accuracy readouts of sensors 18*a*-18*n* using low power electronics.

Discussion of Possible Embodiments

The following are non-exclusive descriptions of possible embodiments of the present invention.

A method of obtaining a high accuracy value from at least one sensor using a conditioning circuit includes providing, by a processor, a first signal to the at least one sensor and obtaining a first sensor response from the at least one sensor; providing, by the processor, the first signal to a reference component and obtaining a first reference response from the reference component; providing, by the processor, a second signal, greater than the first signal, to the at least one sensor and obtaining a second sensor response from the at least one sensor; providing, by the processor, the second signal to the reference component and obtaining a second reference response from the reference component; and calculating, by the processor, the high accuracy value based on the first sensor response, the second sensor response, the first reference response and the second reference response.

The method of the preceding paragraph can optionally include, additionally and/or alternatively, any one or more of the following features, configurations and/or additional components:

A further embodiment of the foregoing method, wherein providing, by the processor, the first signal to the at least one sensor and obtaining the first sensor response from the at least one sensor includes providing, by the processor, a square wave output to a first low pass filter circuit; filtering, by the first low pass filter circuit, the square wave output to produce a sine wave output signal; and generating a first low impedance signal by a dual voltage drive circuit as the first signal using the sine wave output signal.

A further embodiment of any of the foregoing methods, wherein generating the first low impedance signal by the dual voltage drive circuit includes controlling, by the processor, a first switch to selectively pull down the sine wave signal to generate the first low impedance signal.

A further embodiment of any of the foregoing methods, by the processor, the first signal to the at least one sensor and obtaining the first sensor response from the at least one sensor further includes converting a first sensor current to a first sensor voltage using a current to voltage converter circuit.

A further embodiment of any of the foregoing methods, wherein providing, by the processor, the first signal to the at least one sensor and obtaining the first sensor response from the at least one sensor further includes rectifying and filtering the first sensor voltage to provide a first rectified sensor voltage; converting the first rectified sensor voltage to a first digital sensor signal; and providing the first digital sensor signal to the processor as the first sensor response.

A further embodiment of any of the foregoing methods, further including driving the high accuracy value as a serial data output from the conditioning circuit.

A further embodiment of any of the foregoing methods, wherein the reference component is a high precision resistor and the at least one sensor is a capacitive sensor.

A method of obtaining a high accuracy value from a sensing element using a conditioning circuit includes providing first and second low impedance signals to the sensing element, wherein the second low impedance signal is greater than the first low impedance signal; obtaining first and second sensing responses from the sensing element based on the respective first and second low impedance signals; providing the first and the second low impedance signals to a reference component; obtaining first and second reference responses from the reference component based on the respective first and second low impedance signals; and determining, by a processor, the high accuracy value based on the first and the second sensing responses and the first and the second reference responses.

The method of the preceding paragraph can optionally include, additionally and/or alternatively, any one or more of the following features, configurations and/or additional components:

A further embodiment of the foregoing method, wherein providing the first and the second low impedance signals to the sensing element includes providing, by the processor, a square wave output to a first low pass filter circuit; and filtering, by the first low pass filter circuit, the square wave output to produce a sine wave output signal.

A further embodiment of any of the foregoing methods, wherein providing the first and the second low impedance signals to the sensing element further includes controlling, by the processor, a switch of a dual voltage drive circuit to provide the first low impedance signal based on the sine wave output signal; and controlling, by the processor, the switch of the dual voltage drive circuit to provide the second low impedance signal based on the sine wave output signal.

A further embodiment of any of the foregoing methods, wherein obtaining first and second sensing responses from the sensing element based on the respective first and second low impedance signals includes converting a first sensing current to a first sensing voltage using a current to voltage converter circuit based on the first low impedance signal.

A further embodiment of any of the foregoing methods, wherein obtaining first and second sensing responses from the sensing element based on the respective first and second low impedance signals further includes converting a second sensing current to a second sensing voltage using the current to voltage converter circuit based on the second low impedance signal.

A further embodiment of any of the foregoing methods, wherein obtaining first and second sensing responses from the sensing element based on the respective first and second low impedance signals further includes rectifying and filtering the first and the second sensing voltages to provide respective first and second rectified sensing voltages; converting the first and the second rectified sensing voltages to respective first and second digital sensor signals; and providing the first and the second digital sensor signals to the processor as the respective first and second sensing responses.

A further embodiment of any of the foregoing methods, further including driving the high accuracy value as a serial data output from the conditioning circuit.

A further embodiment of any of the foregoing methods, wherein the reference component is a high precision resistor and the at least one sensing element is a capacitive sensing element.

A conditioning circuit for a sensor system includes a processor, a dual voltage drive, a switch network, and a current-to-voltage converter. The dual voltage drive is configured to generate first and second low impedance signals, wherein the second low impedance signal is greater than the first low impedance signal. The switch network is configured to select between at least one sensor and a reference component. The current-to-voltage converter configured to convert a current signal from the switch network to a voltage signal. The processor controls the switch network and dual voltage drive to receive a first sensor response from the at least one sensor and a first reference response from the reference component based on the first low impedance signal, and receive a second sensor response from the at least one sensor and a second reference response from the reference component based on the second low impedance signal. The processor is configured to calculate a sensed value for the at least one sensor based upon the first and second sensor responses and the first and second reference responses.

The circuit of the preceding paragraph can optionally include, additionally and/or alternatively, any one or more of the following features, configurations and/or additional components:

A further embodiment of the foregoing circuit, wherein the dual voltage drive includes a switch, and wherein the processor controls the switch to selectively provide the first and second low impedance signals.

A further embodiment of any of the foregoing circuits, wherein the processor is configured to drive the sensed value as a serial data output.

A further embodiment of any of the foregoing circuits, further comprising first and second low pass filters and a rectifier circuit configured to rectify and condition the voltage signal from the current-to-voltage circuit as a conditioned signal for the processor, wherein conditioned signal is utilized as the first and the second sensor response and the first and the second reference responses.

A further embodiment of any of the foregoing circuits, wherein the reference component is a high precision resistor.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of obtaining a high accuracy value from at least one sensor using a conditioning circuit, the method comprising:
providing, by a processor, a first signal to the at least one sensor and obtaining a first sensor response from the at least one sensor;
providing, by the processor, the first signal to a reference component and obtaining a first reference response from the reference component;
providing, by the processor, a second signal, greater than the first signal, to the at least one sensor and obtaining a second sensor response from the at least one sensor;
providing, by the processor, the second signal to the reference component and obtaining a second reference response from the reference component; and
determining, by the processor, the high accuracy value based on the first sensor response, the second sensor response, the first reference response and the second reference response.

2. The method of claim 1, wherein providing, by the processor, the first signal to the at least one sensor and obtaining the first sensor response from the at least one sensor comprises:
providing, by the processor, a square wave output to a first low pass filter circuit;
filtering, by the first low pass filter circuit, the square wave output to produce a sine wave output signal; and
generating a first low impedance signal by a dual voltage drive circuit as the first signal using the sine wave output signal.

3. The method of claim 2, wherein generating the first low impedance signal by the dual voltage drive circuit comprises controlling, by the processor, a first switch to selectively pull down the sine wave signal to generate the first low impedance signal.

4. The method of claim 2, wherein providing, by the processor, the first signal to the at least one sensor and obtaining the first sensor response from the at least one sensor further comprises converting a first sensor current to a first sensor voltage using a current to voltage converter circuit.

5. The method of claim 4, wherein providing, by the processor, the first signal to the at least one sensor and obtaining the first sensor response from the at least one sensor further comprises:
rectifying and filtering the first sensor voltage to provide a first rectified sensor voltage;
converting the first rectified sensor voltage to a first digital sensor signal; and
providing the first digital sensor signal to the processor as the first sensor response.

6. The method of claim 1, further comprising driving the high accuracy value as a serial data output from the conditioning circuit.

7. The method of claim 1, wherein the reference component is a high precision resistor and the at least one sensor is a capacitive sensor.

8. A method of obtaining a high accuracy value from a sensing element using a conditioning circuit, the method comprising:
providing first and second low impedance signals to the sensing element, wherein the second low impedance signal is greater than the first low impedance signal;
obtaining first and second sensing responses from the sensing element based on the respective first and second low impedance signals;
providing the first and the second low impedance signals to a reference component;

obtaining first and second reference responses from the reference component based on the respective first and second low impedance signals; and determining, by a processor, the high accuracy value based on the first and the second sensing responses and the first and the second reference responses.

9. The method of claim 8, wherein providing the first and the second low impedance signals to the sensing element comprises:

providing, by the processor, a square wave output to a first low pass filter circuit; and filtering, by the first low pass filter circuit, the square wave output to produce a sine wave output signal.

10. The method of claim 9, wherein providing the first and the second low impedance signals to the sensing element further comprises:

controlling, by the processor, a switch of a dual voltage drive circuit to provide the first low impedance signal based on the sine wave output signal; and controlling, by the processor, the switch of the dual voltage drive circuit to provide the second low impedance signal based on the sine wave output signal.

11. The method of 8, wherein obtaining first and second sensing responses from the sensing element based on the respective first and second low impedance signals comprises converting a first sensing current to a first sensing voltage using a current to voltage converter circuit based on the first low impedance signal.

12. The method of 11, wherein obtaining first and second sensing responses from the sensing element based on the respective first and second low impedance signals further comprises converting a second sensing current to a second sensing voltage using the current to voltage converter circuit based on the second low impedance signal.

13. The method of claim 12, wherein obtaining first and second sensing responses from the sensing element based on the respective first and second low impedance signals further comprises:

rectifying and filtering the first and the second sensing voltages to provide respective first and second rectified sensing voltages;

converting the first and the second rectified sensing voltages to respective first and second digital sensor signals; and providing the first and the second digital sensor signals to the processor as the respective first and second sensing responses.

14. The method of claim 8, further comprising driving the high accuracy value as a serial data output from the conditioning circuit.

15. The method of claim 8, wherein the reference component is a high precision resistor and the at least one sensing element is a capacitive sensing element.

16. A conditioning circuit for a sensor system, the conditioning circuit comprising:

a processor;

a dual voltage drive configured to generate first and second low impedance signals, wherein the second low impedance signal is greater than the first low impedance signal;

a switch network configured to select between at least one sensor and a reference component; and a current-to-voltage converter configured to convert a current signal from the switch network to a voltage signal;

wherein the processor controls the switch network and dual voltage drive to receive a first sensor response from the at least one sensor and a first reference response from the reference component based on the first low impedance signal, and receive a second sensor response from the at least one sensor and a second reference response from the reference component based on the second low impedance signal, and wherein the processor is configured to determine a sensed value for the at least one sensor based upon the first and second sensor responses and the first and second reference responses.

17. The circuit of claim 16, wherein the dual voltage drive includes a switch, and wherein the processor controls the switch to selectively provide the first and second low impedance signals.

18. The circuit of claim 16, wherein the processor is configured to drive the sensed value as a serial data output.

19. The circuit of claim 16, further comprising first and second low pass filters and a rectifier circuit configured to rectify and condition the voltage signal from the current-to-voltage circuit as a conditioned signal for the processor, wherein conditioned signal is utilized as the first and the second sensor response and the first and the second reference responses.

20. The circuit of claim 16, wherein the reference component is a high precision resistor.

* * * * *